US012728487B2

(12) United States Patent
Oda et al.

(10) Patent No.: US 12,728,487 B2
(45) Date of Patent: Sep. 8, 2026

(54) MANUFACTURING DEVICE AND MANUFACTURING METHOD FOR HEAT EXCHANGER AND TRANSPORT CARRIAGE USED FOR MANUFACTURING DEVICE

(71) Applicant: DAIKIN INDUSTRIES, LTD., Osaka (JP)

(72) Inventors: Takaya Oda, Osaka (JP); Takaki Ohata, Osaka (JP); Motofumi Shimizu, Osaka (JP); Takayuki Takahashi, Osaka (JP)

(73) Assignee: DAIKIN INDUSTIRES, LTD., Osaka (JP)

( * ) Notice: Subject to any disclaimer, the term of this patent is extended or adjusted under 35 U.S.C. 154(b) by 0 days.

(21) Appl. No.: 18/898,457

(22) Filed: Sep. 26, 2024

(65) Prior Publication Data

US 2025/0018511 A1 Jan. 16, 2025

Related U.S. Application Data

(63) Continuation of application No. PCT/JP2023/002517, filed on Jan. 26, 2023.

(30) Foreign Application Priority Data

Mar. 31, 2022 (JP) ................................ 2022-059774

(51) Int. Cl.
*B23P 15/26* (2006.01)

(52) U.S. Cl.
CPC .................................. *B23P 15/26* (2013.01)

(58) Field of Classification Search
CPC ... F28F 1/325; F28F 2215/12; F28D 1/05383; B21D 53/08; B21D 53/085; B23P 15/26; B23P 19/04
See application file for complete search history.

(56) References Cited

U.S. PATENT DOCUMENTS 10,343,239 B2 7/2019 Lee et al.

FOREIGN PATENT DOCUMENTS

| | | | |
|---|---|---|---|
| CN | 113492302 | A | 10/2021 |
| JP | 2019-89084 | A | 6/2019 |
| JP | 2020-169734 | A | 10/2020 |

OTHER PUBLICATIONS

International Preliminary Report of corresponding PCT Application No. PCT/JP2023/002517 dated Oct. 10, 2024.
International Search Report of corresponding PCT Application No. PCT/JP2023/002517 dated Apr. 11, 2023.
European Search Report of corresponding EP Application No. 23 77 8800.5 dated Jun. 6, 2025.

*Primary Examiner* — Moshe Wilensky
(74) *Attorney, Agent, or Firm* — Spencer Fane LLP

(57) ABSTRACT

A heat exchanger includes a flat tube and a fin that is formed in an elongated plate shape and that includes a fin slit formed by notching the fin in a direction orthogonal to a longitudinal direction of the fin. A manufacturing device for manufacturing the heat exchanger includes a transport carriage and an insertion head. The transport carriage transports the flat tube to a predetermined delivery position while the flat tube maintains an upright posture. The insertion head moves up and down in order to receive the flat tube from the transport carriage and then inserts the flat tube into the fin slit from above the fin.

4 Claims, 12 Drawing Sheets

40
50
51
52
53
54
70
71
72
72a
72b
73
74
75
75
77
41
P
60
61
62
63
64
UP
DOWN
LEFT
RIGHT

FIG.8
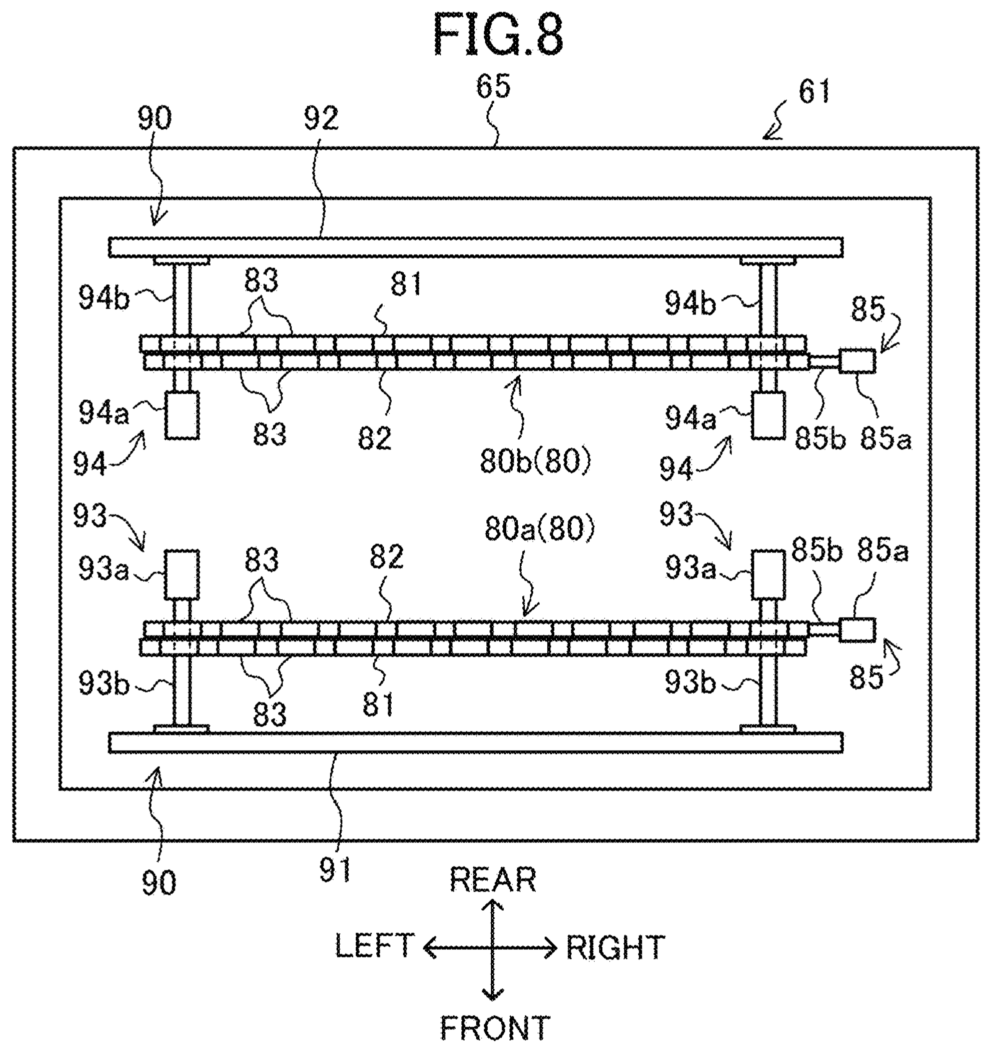
FIG.9A
FIG.9B
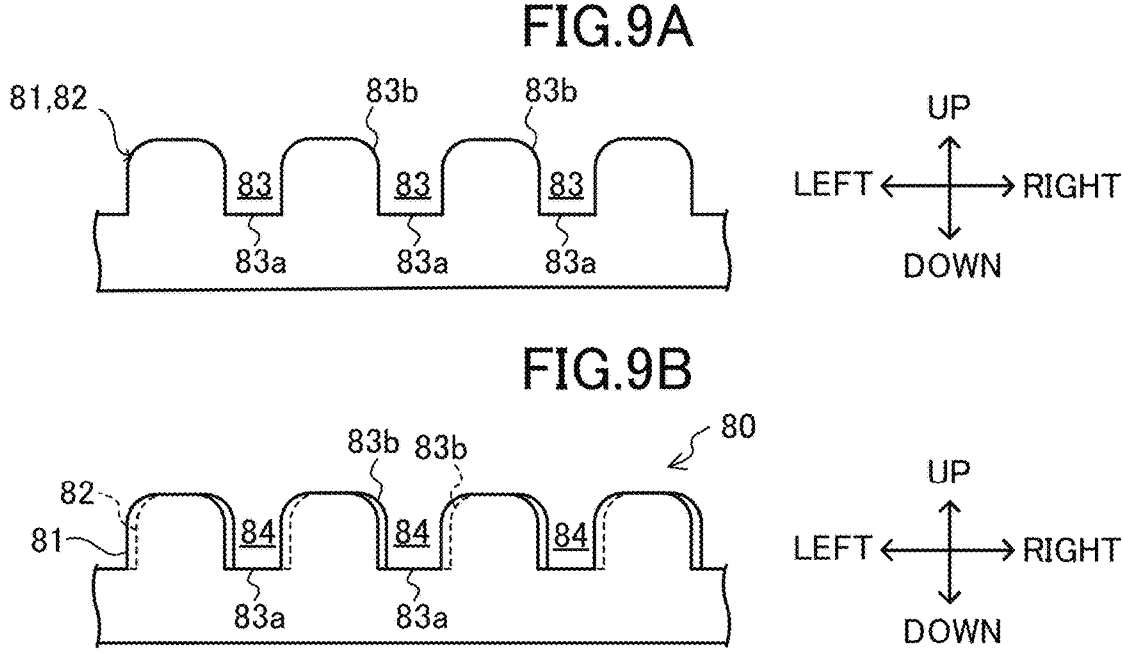

FIG.11

FIG.12A 92
90
80b(80)
80a(80)
90
91
61
20
REAR
LEFT
RIGHT
FRONT

REAR
LEFT
RIGHT
FRONT

MANUFACTURING DEVICE AND MANUFACTURING METHOD FOR HEAT EXCHANGER AND TRANSPORT CARRIAGE USED FOR MANUFACTURING DEVICE

CROSS-REFERENCE TO RELATED APPLICATIONS

This is a continuation of International Application No. PCT/JP2023/002517 filed on Jan. 26, 2023, which claims priority to Japanese Patent Application No. 2022-059774, filed on Mar. 31, 2022. The entire disclosures of these applications are incorporated by reference herein.

BACKGROUND

Technical Field

The present disclosure relates to a manufacturing device and manufacturing method for manufacturing a heat exchanger and also relates to a transport carriage used for the manufacturing device.

Background Art

Japanese Unexamined Patent Publication No. 2020-169734 discloses an assembling device for assembling a heat exchanger where flat heat transfer tubes are inserted into heat transfer fins. The assembling device includes a heat transfer tube insertion unit for inserting a plurality of heat transfer tubes into slots of the heat transfer fins, and a heat transfer tube row mounting member for transporting the heat transfer tubes to the heat transfer tube insertion unit. The heat transfer tube insertion unit as an insertion head includes a heat transfer tube grip member for gripping the plurality of heat transfer tubes arranged in a row on the heat transfer tube row mounting member.

SUMMARY

A first aspect of the present disclosure is directed to a manufacturing device for manufacturing a heat exchanger. The heat exchanger includes a flat tube and a fin that is formed in an elongated plate shape and that includes a fin slit formed by notching the fin in a direction orthogonal to a longitudinal direction of the fin. The manufacturing device for manufacturing the heat exchanger includes a transport carriage and an insertion head. The transport carriage is configured to transport the flat tube to a predetermined delivery position while the flat tube maintains an upright posture. The insertion head is configured to move up and down in order to receive the flat tube from the transport carriage and then insert the flat tube into the fin slit from above the fin.

BRIEF DESCRIPTION OF THE DRAWINGS

FIG. 8 is a top view showing a schematic configuration of a heat transfer tube tray.

FIG. 9A is an enlarged view of a main part of a plate member.

FIG. 9B is an enlarged view of main parts of a first plate member and a second plate member as viewed in an arrangement direction.

Figure 11:
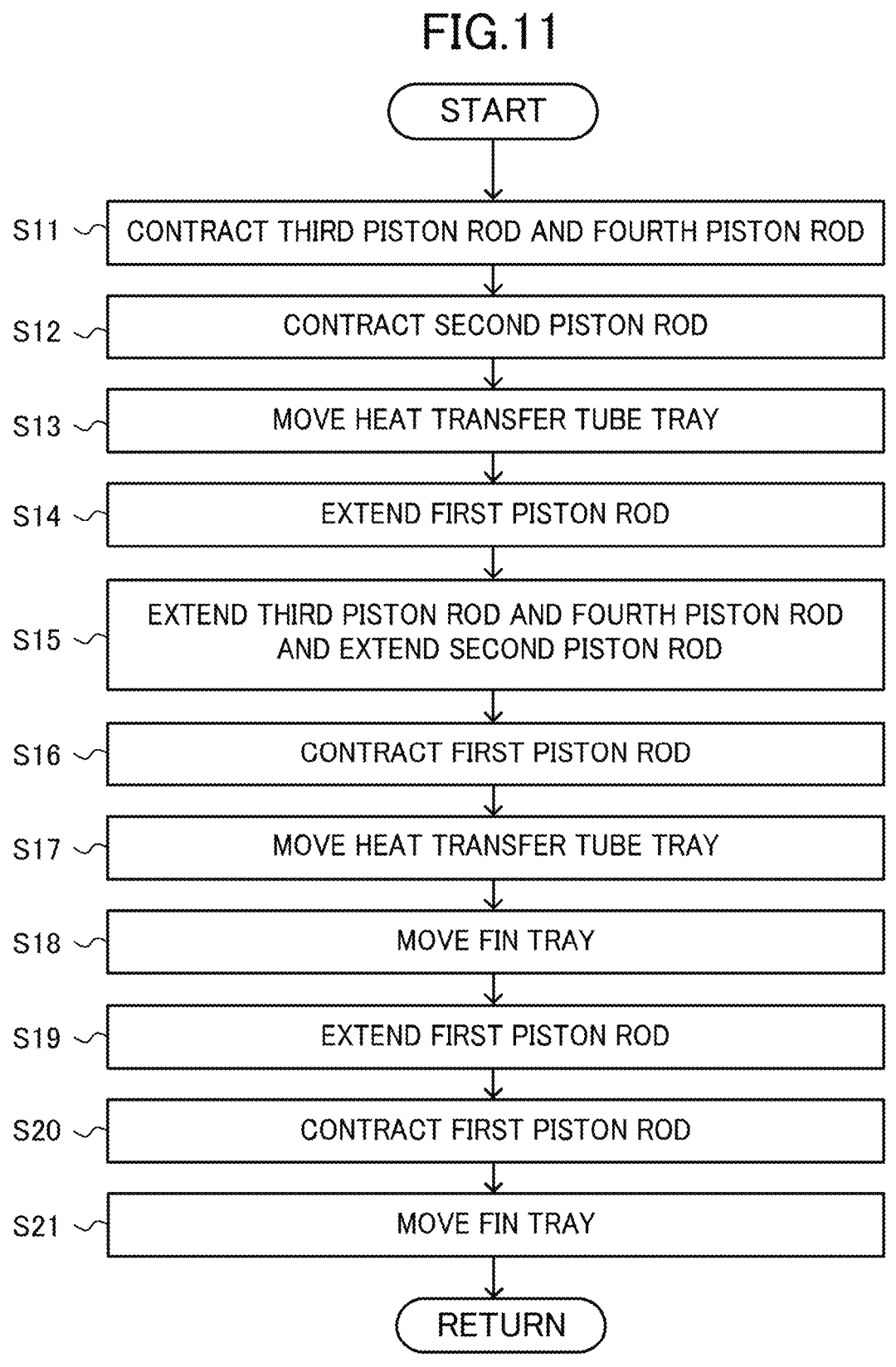

FIG. 11 is a flowchart showing a flow of assembling fins and heat transfer tubes.

FIG. 12A, FIG. 12B and FIG. 12C show operations of a first correction mechanism and a second correction mechanism as viewed from the top.

FIG. 13A and FIG. 13B show an operation of the first correction mechanism as viewed in the arrangement direction in which the first plate member and the second plate member are arranged.

FIG. 14A and FIG. 14B show an operation of a second correction mechanism of another embodiment as viewed from the top.

DETAILED DESCRIPTION OF EMBODIMENT(S)

Embodiments of the present invention will be described in detail below with reference to the drawings. The following embodiments are merely exemplary ones in nature, and are not intended to limit the scope, application, or uses of the invention. Features of the embodiments, variations, and other examples described below can be combined or partially substituted within the range where the present invention can be embodied.

(1) Air Conditioner

Figure 1:
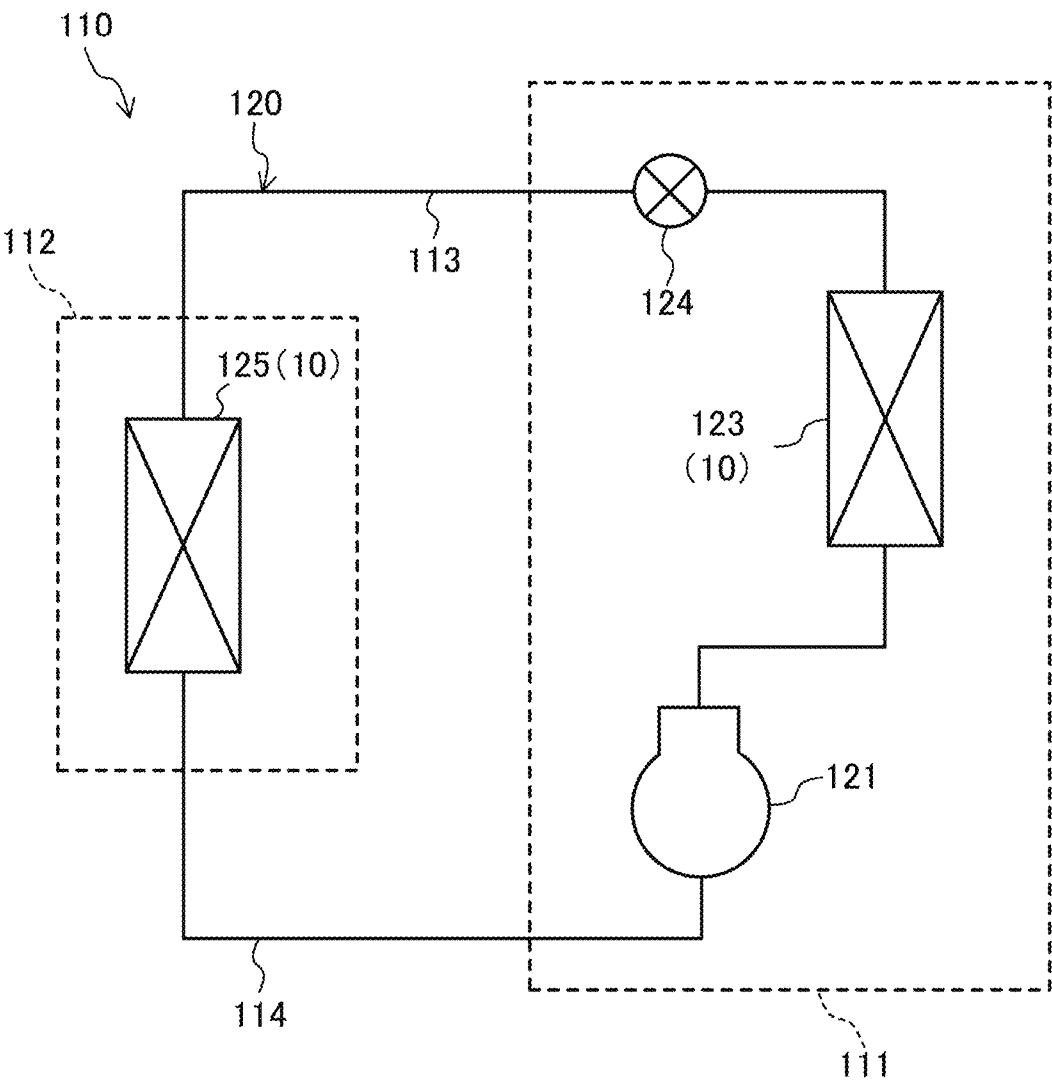
FIG. 1 is a piping system diagram showing a configuration of an air conditioner including a heat exchanger of an embodiment.

An air conditioner (110) conditions air in an indoor space. Specifically, as shown in FIG. 1, the air conditioner (110) includes an outdoor unit (111) and an indoor unit (112). The outdoor unit (111) and the indoor unit (112) are connected to each other by a liquid connection pipe (113) and a gas connection pipe (114). Accordingly, a refrigerant circuit (120) is formed in the air conditioner (110).

The outdoor unit (111) includes a compressor (121), an outdoor heat exchanger (123), and an expansion valve (124). The compressor (121) compresses a refrigerant sucked from the gas connection pipe (114) and discharges a compressed refrigerant to the liquid connection pipe (113). The outdoor heat exchanger (123) exchanges heat between outdoor air and a refrigerant. The expansion valve (124) decompresses a refrigerant in the liquid connection pipe (113). The indoor unit (112) includes an indoor heat exchanger (125). The indoor heat exchanger (125) exchanges heat between outdoor air and a refrigerant.

(2) Heat Exchanger

The outdoor heat exchanger (123) and the indoor heat exchanger (125) are heat exchangers (10) of the present disclosure. Hereinafter, the outdoor heat exchanger (123) and the indoor heat exchanger (125) are collectively referred to as a heat exchanger (10).

Figure 2:
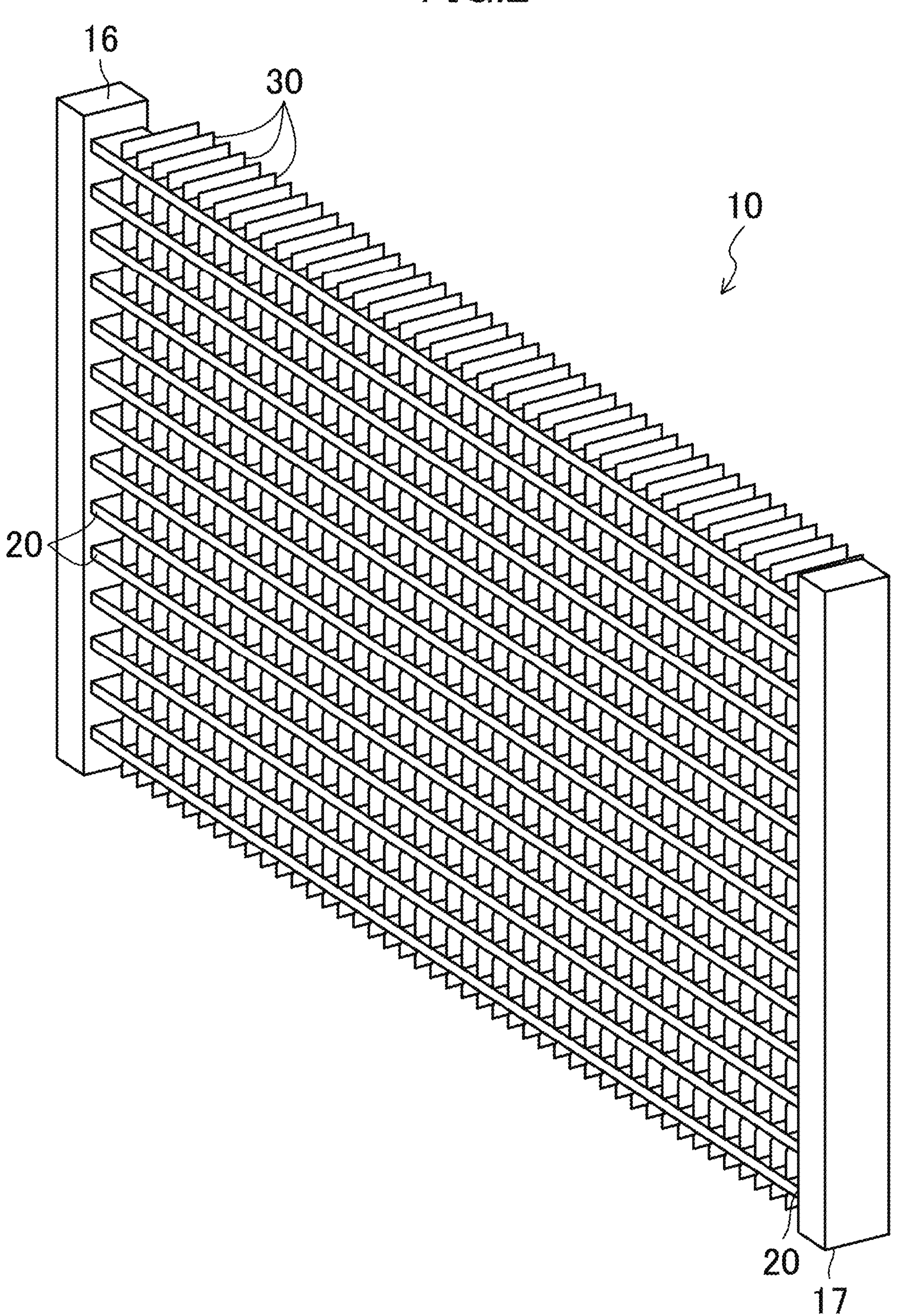
FIG. 2 is a schematic perspective view of the heat exchanger.
Figure 3:
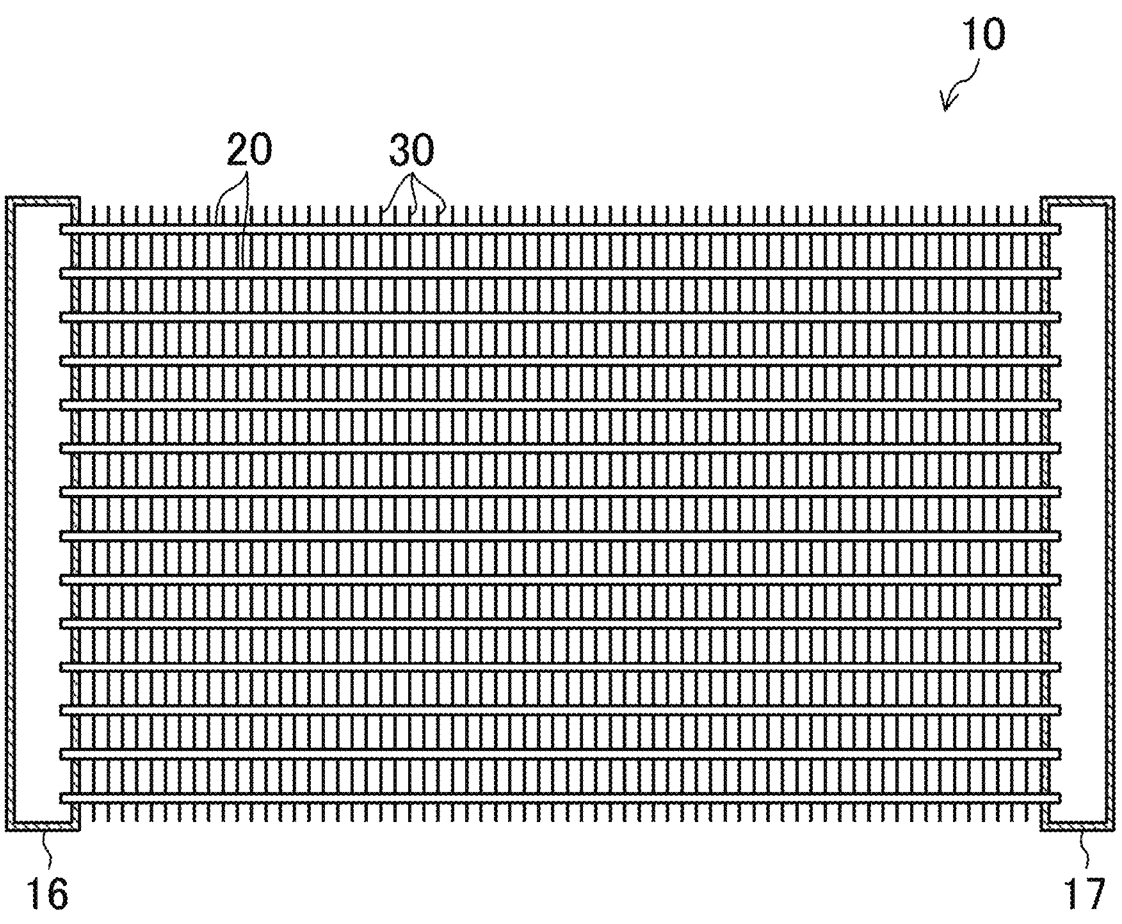
FIG. 3 is a cross-sectional view of the heat exchanger taken along the line III-III of FIG. 2.

As shown in FIGS. 2 and 3, the heat exchanger (10) of this embodiment includes a first header collecting pipe (16), a second header collecting pipe (17), a plurality of heat transfer tubes (20), and a plurality of fins (30). The first header collecting pipe (16), the second header collecting pipe (17), the heat transfer tubes (20), and the fins (30) are each made of an aluminum alloy.

(2-1) Header Collecting Pipe

The first header collecting pipe (16) and the second header collecting pipe (17) are each formed in a hollow quadrangular prism. A plurality of holes are formed on one side surface of each of the first header collecting pipe (16) and the second header collecting pipe (17) in the longitudinal direction. These plurality of holes are holes into which ends of the plurality of heat transfer tubes (20) are inserted.

One end of each of the plurality of heat exchangers (10) is inserted into the first header collecting pipe (16), and the other end of each of the plurality of heat exchangers (10) is inserted into the second header collecting pipe (17).

(2-2) Heat Transfer Tube

Figure 4:
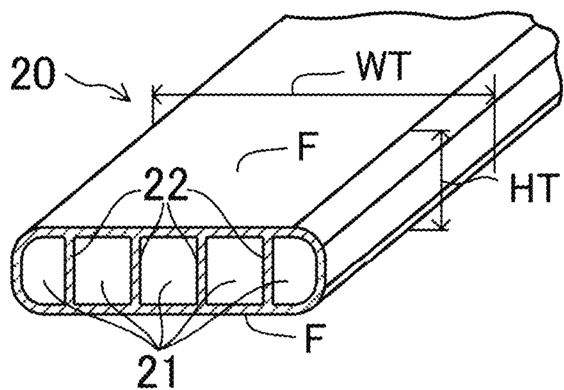
FIG. 4 is a schematic perspective view of a heat transfer tube of the embodiment.

As shown in FIG. 4, the heat transfer tube (20) has a rectangular cross section with round corners, the cross section being orthogonal to the direction in which the heat transfer tube (20) extends from one end to the other end. The heat transfer tube (20) is formed in a flat shape where the width WT is larger than the thickness HT. The heat transfer tube (20) is a flat tube (20) of the present disclosure. In the following description, the thickness direction and the width direction refer to the directions in the cross section of the heat transfer tube (20).

A plurality of flow passages (21) partitioned by partition walls (22) are formed in the heat transfer tube (20). In the heat transfer tube (20), the plurality of flow passages (21) extend parallel to each other in the direction in which the heat transfer tube (20) extends, and are opened at both end surfaces of the heat transfer tube (20). In the heat transfer tube (20), the plurality of flow passages (21) are arranged in a row in the width direction of the heat transfer tube (20).

The heat transfer tube (20) is inserted into fin slits (33) of the fins (30). The heat transfer tube (20) inserted into the fin slits (33) extends in a substantially horizontal direction, and is arranged so that its plate surfaces (F) extending in the width direction face each other. The plurality of heat transfer tubes (20) are arranged in a row at regular intervals.

One end of each heat transfer tube (20) is inserted into the first header collecting pipe (16), and the other end thereof is inserted into the second header collecting pipe (17). The header collecting pipes (16, 17) are fixed to the heat transfer tubes (20) by brazing using a brazing material.

(2-3) Fin

Figure 5:
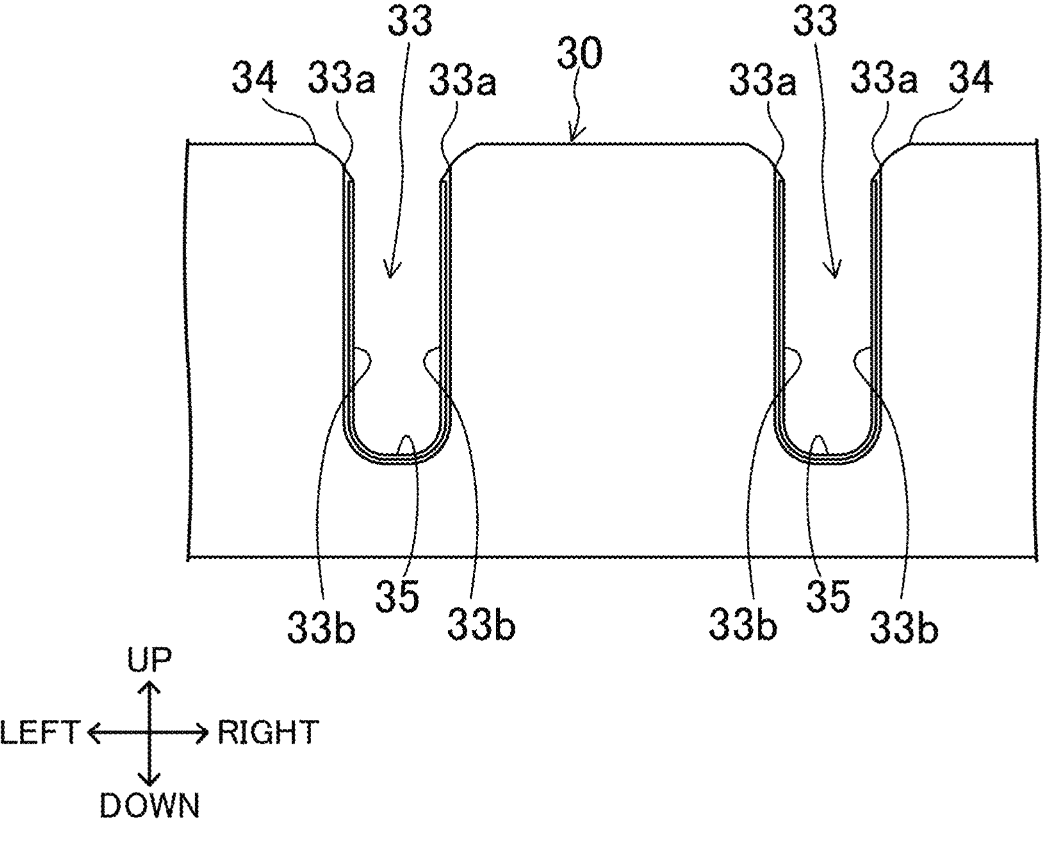
FIG. 5 is an enlarged front view of a main part of a fin of the embodiment.

As shown in FIG. 5, the fin (30) is an elongated plate-shaped member. The fin (30) is formed in a generally rectangular shape. The fin (30) is formed by pressing a flat plate-shaped material. In the following description, the long side direction of the fin (30) may be referred to as the left-right direction, and the short side direction (width direction) may be referred to as the up-down direction.

The fin (30) includes the plurality of fin slits (33). The fin slits (33) are formed in one of long sides of the fin (30). The plurality of fin slits (33) are provided at regular intervals in the fin (30). Each fin slit (33) is formed by notching the fin (30) in the direction orthogonal to the longitudinal direction of the fin (30). The fin slit (33) is formed by notching the long side of the fin (30) in the width direction. The length from an open end (34) to a bottom surface (35) of the fin slit (33) is equal to the width length of the heat transfer tube (20).

The fin slit (33) is formed symmetrically. The fin slit (33) includes a first slit portion (33*a*) and a second slit portion (33*b*). The first slit portion (33*a*) and the second slit portion (33*b*) are continuously formed from the open end (34) to the bottom surface (35) of the fin slit (33).

The open end (34) of the first slit portion (33*a*) is the open end (34) of the fin slit (33). A lower end of the first slit portion (33*a*) meets an upper end of the second slit portion (33*b*). The first slit portion (33*a*) is formed in a taper shape and has a slit width gradually narrowed from the upper end to the lower end. Accordingly, when the heat transfer tube (20) is inserted into the fin slit (33), the end of the heat transfer tube (20) abuts on the first slit portion (33*a*) such that the first slit portion (33*a*) guides the heat transfer tube (20) to the second slit portion (33*b*).

The second slit portion (33*b*) is narrower than a slit width of the open end (34) of the fin slit (33). The slit width of the second slit portion (33*b*) is constant. The slit width of the second slit portion (33*b*) is slightly narrower than the length of the heat transfer tube (20) in the thickness direction. By a fastening allowance being provided in this manner, the heat transfer tube (20) can be fitted into the second slit portion (33*b*) without gaps. The bottom surface (35) of the second slit portion (33*b*) is the bottom surface (35) of the corresponding fin slit (33). The bottom surface (35) of the second slit portion (33*b*) is formed in a U-shape so as to be in contact with the heat transfer tube (20) without gaps.

The fin (30) has fin tabs (not shown). The fin tab is formed by cutting and raising a part of the fin (30). The fin tabs are arranged at predetermined intervals in the longitudinal direction of the fin (30). The plurality of fins (30) are arranged to face each other in the thickness direction. The fin tabs are in contact with the adjacent one of the fins (30), thereby maintaining a certain distance between the fin (30) and the fin (30) adjacent to each other.

(3) Device for Manufacturing Heat Exchanger

Figure 6:
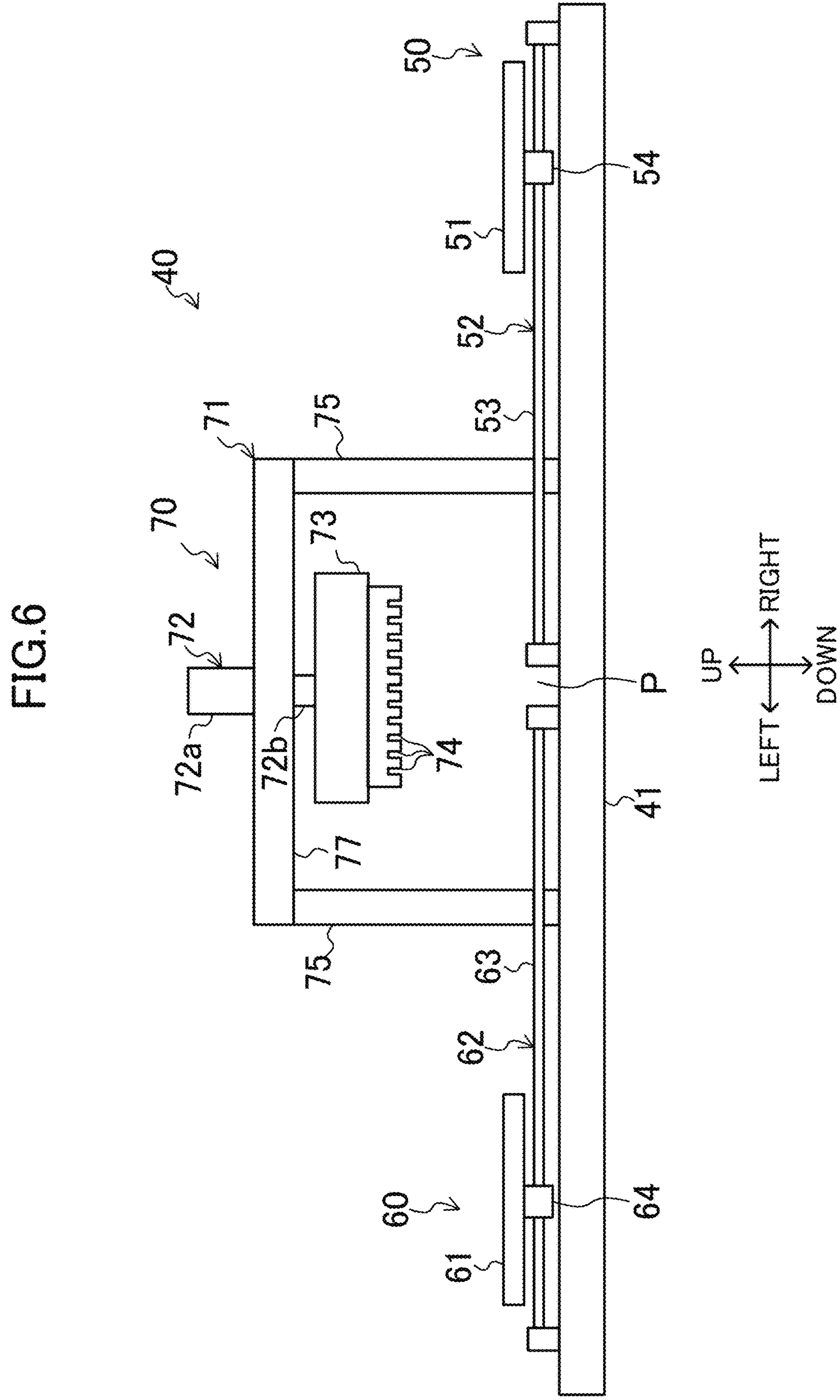
FIG. 6 is a front view showing a schematic configuration of a manufacturing device of the embodiment.

As shown in FIG. 6, a manufacturing device (40) of this embodiment is a device for assembling the heat exchanger (10). The manufacturing device (40) inserts the heat transfer tube (20) into the fin slit (33) of the fin (30).

The manufacturing device (40) of this example includes a base (41), a fin transport unit (50), a heat transfer tube transport unit (60), and a heat transfer tube insertion unit (70). The heat transfer tube transport unit (60), the fin transport unit (50), and the heat transfer tube insertion unit (70) are arranged on an upper surface of the base (41). When the manufacturing device (40) is viewed from the front, the heat transfer tube transport unit (60) is disposed on the left of the heat transfer tube insertion unit (70), and the fin transport unit (50) is disposed on the right of the heat transfer tube insertion unit (70). In the following description, "right", "left", "up", and "down" indicate directions when the manufacturing device (40) is viewed from the front.

(3-1) Fin Transport Unit

The fin transport unit (50) transports the fins (30) to the heat transfer tube insertion unit (70). The fin transport unit (50) of this embodiment includes a first transport mechanism (52) and a fin tray (51).

The first transport mechanism (52) is a ball screw. The first transport mechanism (52) includes a first screw shaft (53) and a first nut portion (54). The first screw shaft (53) extends from the right end of the base (41) to a delivery position (P) which will be described later. The first screw shaft (53) is driven and rotated by a given motor (not shown). The first screw shaft (53) is screwed into the first nut portion (54).

The first nut portion (54) moves in the left-right direction by rotation of the first screw shaft (53). The first nut portion (54) fixes a lower surface of the fin tray (51). The fin tray (51) moves on the first screw shaft (53) in the left-right direction as the first nut portion (54) moves.

Figure 7:
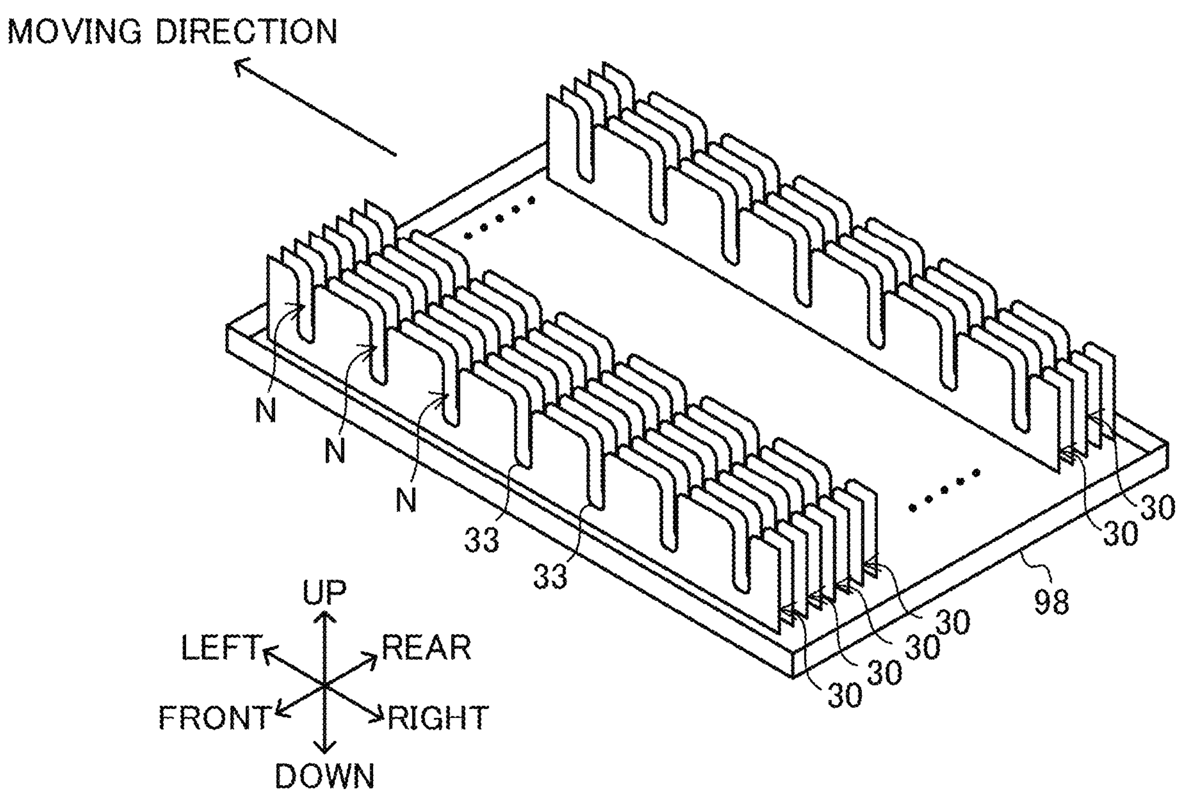
FIG. 7 is a perspective view of fins arranged in a fin tray.

The plurality of fins (30) are mounted in the fin tray (51) (see FIG. 7). The fin tray (51) in which the fins (30) are mounted moves from right to left. The plurality of fins (30) in the fin tray (51) are arranged so as to be adjacent to each other in the direction (the front-back direction) orthogonal to the moving direction in a state in which the open ends of the fin slits (33) of each fin (30) are opened upward. At this time, when viewed in the arrangement direction in which the fins (30) are arranged, the fins (30) are arranged so that the fin slit (33) of one of the fins (30) matches the corresponding fin slit (33) of another one of the fins (30). The fin slits (33) arranged in a row in the left-right direction in this manner are referred to as a fin slit row (N). The number of fin slit rows (N) is equal to the number of fin slits (33).

(3-2) Heat Transfer Tube Transport Unit

The heat transfer tube transport unit (60) transports the heat transfer tubes (20) to the heat transfer tube insertion unit (70). The heat transfer tube transport unit (60) of this embodiment includes a second transport mechanism (62) and a heat transfer tube tray (61).

The second transport mechanism (62) is the same ball screw as the first transport mechanism (52). The second transport mechanism (62) includes a second screw shaft (63) and a second nut portion (64). The second screw shaft (63) extends from the left end of the base (41) to the delivery position (P) which will be described later. The second screw shaft (63) is driven and rotated by a given motor (not shown). The second screw shaft (63) is screwed into the second nut portion (64).

The second nut portion (64) moves in the left-right direction by rotation of the second screw shaft (63). The second nut portion (64) fixes a lower surface of the heat transfer tube tray (61). The heat transfer tube tray (61) moves on the second screw shaft (63) in the left-right direction as the second nut portion (64) moves.

The plurality of heat transfer tubes (20) are mounted inside the heat transfer tube tray (61). The heat transfer tube tray (61) in which the heat transfer tubes (20) are mounted moves from left to right. The plurality of heat transfer tubes (20) are arranged in the heat transfer tube tray (61) so that plate surfaces (F) are adjacent to each other in the moving direction (i.e., the left-right direction). The heat transfer tube tray (61) will be described in detail later.

(3-3) Heat Transfer Tube Insertion Unit

The heat transfer tube insertion unit (70) receives the heat transfer tubes (20) from the heat transfer tube tray (61) at the delivery position (P), and inserts the heat transfer tubes (20) into the fin slits (33) of the fins (30) of the fin tray (51) having moved to the delivery position (P).

The heat transfer tube insertion unit (70) includes a frame (71), a first cylinder (72), and an insertion head (73).

The frame (71) includes four columns (75) extending in the up-down direction and one head frame (77). The columns (75) are arranged at four corners of the heat transfer tube insertion unit (70) when the heat transfer tube insertion unit (70) is viewed from above. The head frame (77) is provided to connect upper ends of the four columns (75).

The first cylinder (72) is fixed to the center of the head frame (77). The first cylinder (72) includes a first cylinder tube (72*a*) and a first piston rod (72*b*). The first cylinder (72) is a hydraulic cylinder, for example. The first piston rod (72*b*) is extended and contracted in the up-down direction by adjustment to the oil pressure in the first cylinder tube (72*a*).

The insertion head (73) is fixed to a lower end of the first piston rod (72*b*). The insertion head (73) is moved up and down by extension and contraction of the first piston rod (72*b*). The insertion head (73) has a lower surface provided with a plurality of grooves (74). The grooves (74) are grooves into which the heat transfer tubes (20) are inserted. The grooves (74) extend in the front-back direction. The plurality of grooves (74) are spaced at regular intervals.

(3-4) Heat Transfer Tube Tray

The heat transfer tube tray (61) is an example of the transport carriage (61) of the present disclosure. The heat transfer tube tray (61) transports the heat transfer tubes (20) to the delivery position while the heat transfer tubes (20) maintain an upright posture. The term "upright" refers to the state in which the plate surfaces (F) of the heat transfer tubes (20) stand upright to the extent that the heat transfer tubes (20) are inserted into the grooves (74) only by the insertion head (73) moving down.

As shown in FIGS. 8 and 9, the heat transfer tube tray (61) includes a wall (65), a first correction mechanism (80), and a second correction mechanism (90). The wall (65) is formed in a rectangular frame shape. The wall (65) is provided at an outer edge of the heat transfer tube tray (61). The first correction mechanism (80) and the second correction mechanism (90) are fixed in the wall (65).

(3-4-1) First Correction Mechanism

The first correction mechanism (80) is an example of the first mechanism (80) of the present disclosure. The first correction mechanism (80) changes the plurality of heat transfer tubes (20) transferred onto the heat transfer tube tray (61) from an inclined posture to an upright posture. The first correction mechanism (80) includes a first plate member (81) and a second plate member (82). The first correction mechanism (80) includes a second cylinder (85). The second cylinder (85) includes a second cylinder tube (85*a*) and a second piston rod (85*b*) disposed in the second cylinder tube (85*a*). The second piston rod (85*b*) extends and contracts in the left-right direction.

The first plate member (81) is an example of the first member (81) of the present disclosure. The second plate member (82) is an example of the second member (82) of the present disclosure. The first plate member (81) and the second plate member (82) are substantially rectangular plate members. The first plate member (81) and the second plate member (82) have the same shape. The first plate member (81) and the second plate member (82) are arranged so as to extend from one end to the other end thereof in the left-right direction. Hereinafter, the first plate member (81) and the second plate member (82) may be collectively referred to as a plate member (81, 82).

As shown in FIG. 9A, the plate member (81, 82) includes a plurality of grooves (83) opened upward. Each groove (83) is formed by grooving one of the long sides of the plate member (81, 82) into a square shape. The plurality of grooves (83) are spaced at regular intervals. The groove width of the groove (83) is longer than the length (thickness) of the heat transfer tube (20) in the width direction. The groove (83) has a bottom (83*a*) that is formed linearly. The groove (83) has an open end on which a guide portion (83*b*) is formed.

The guide portion (83*b*) is formed in an arc shape and has a groove width gradually narrowed from the open end toward the bottom. The guide portion (83*b*) guides the heat transfer tube (20) to the bottom (83*a*) of the groove (83) when the heat transfer tube (20) is supplied to the heat transfer tube tray (61). The heat transfer tube (20) is arranged in the groove (83) so that the surface (plate surface) of the heat transfer tube (20) in the widthwise direction leans on the open end of the groove (83). However, the guide portion (83*b*) is formed in an arc shape, and thus damage and breakage of the plate surface of the heat transfer tube (20) can be reduced.

As shown in FIG. 9B, the first plate member (81) and the second plate member (82) are adjacent to each other. Specifically, the first plate member (81) and the second plate member (82) are arranged so that their surfaces (plate surfaces) in the width direction face each other. The first plate member (81) and the second plate member (82) are arranged so that the grooves (83) of the first plate member (81) and the second plate member (82) overlap each other as viewed in the arrangement direction. Hereinafter, this overlapping portion as viewed in the arrangement direction is referred to as the overlapping groove (84).

As shown in FIG. 8, the first plate member (81) is fixed on the heat transfer tube tray (61). The second plate member (82) is provided slidably. Specifically, the second cylinder (85) is disposed to the right of the second plate member (82), and the second piston rod (85*b*) is connected to the right end of the second plate member (82). The second plate member (82) slides in the left-right direction by extension and contraction of the second piston rod (85*b*).

In this embodiment, the first correction mechanism (80) includes two first correction mechanisms (80) arranged on the heat transfer tube tray (61). The two first correction mechanisms (80) include a front first correction mechanism (80*a*) disposed on a front part in the wall (65) and a rear first correction mechanism (80*b*) disposed on a rear part in the wall (65). The plate member (81, 82) of the front first correction mechanism (80*a*) and the plate member (81, 82) of the rear first correction mechanism (80*b*) face each other. The overlapping groove (84) of the front first correction mechanism and the overlapping groove (84) of the rear first correction mechanism (80*b*) overlap each other as viewed in the arrangement direction. When the heat transfer tubes (20) are transferred to the heat transfer tube tray (61), the heat transfer tubes (20) are disposed over the overlapping groove (84) of the front first correction mechanism (80*a*) and the overlapping groove (84) of the rear first correction mechanism (80*b*).

The first correction mechanism (80) switches between a first state and a second state as the second plate member (82) slides. In the first state, the groove width of the overlapping groove (84) is maximized. In the second state, the groove width of the overlapping groove (84) is minimized.

(3-4-2) Second Correction Mechanism

The second correction mechanism (90) is an example of the second mechanism (90) of the present disclosure. The second correction mechanism (90) aligns ends of the plurality of heat transfer tubes (20) mounted on the plate member (81, 82) of the heat transfer tube tray (61). Here, the "ends" of the heat transfer tubes (20) refer to portions located at the front ends and the rear ends of the heat transfer tubes (20) when the heat transfer tube tray (61) in which the heat transfer tubes (20) are mounted is viewed from above.

The second correction mechanism (90) includes a third plate member (91) and a fourth plate member (92). The second correction mechanism (90) includes two third cylinders (93) and two fourth cylinders (94). Each third cylinder (93) includes a third cylinder tube (93*a*) and a third piston rod (93*b*) which extends and contracts in the front-back direction. Each fourth cylinder (94) includes a fourth cylinder tube (94*a*) and a fourth piston rod (94*b*) which extends and contracts in the front-back direction.

The third plate member (91) and the fourth plate member (92) extend in the left-right direction. The third plate member (91) and the fourth plate member (92) face each other. Specifically, the third plate member (91) is disposed in front of the plate member (81, 82) of the front first correction mechanism (80*a*). The fourth plate member (92) is disposed behind the plate member (81, 82) of the rear first correction mechanism (80*b*).

Each third cylinder (93) is disposed behind the third plate member (91). The third piston rod (93*b*) is connected to the left end and the right end of the third plate member (91).

Each fourth cylinder (94) is disposed in front of the fourth plate member (92). The fourth piston rod (94*b*) is connected to the left end and the right end of the fourth plate member (92).

The two third piston rods (93*b*) extend and contract at the same time. The two fourth piston rods (94*b*) extend and contract at the same time. Accordingly, the third plate member (91) and the fourth plate member (92) approach or separate from each other (or move in the front-back direction) while keeping parallel to each other.

The second correction mechanism (90) switches between a third state and a fourth state. In the third state, the distance between the third plate member (91) and the fourth plate member (92) is maximized. The distance between the third plate member (91) and the fourth plate member (92) in the third state is longer than the length of the heat transfer tube (20) in the longitudinal direction. In the fourth state, the distance between the third plate member (91) and the fourth plate member (92) is minimized. The distance between the third plate member (91) and the fourth plate member (92) in the fourth state is equal to the length of the heat transfer tube (20) in the longitudinal direction.

(3-5) Control Unit

Figure 10:
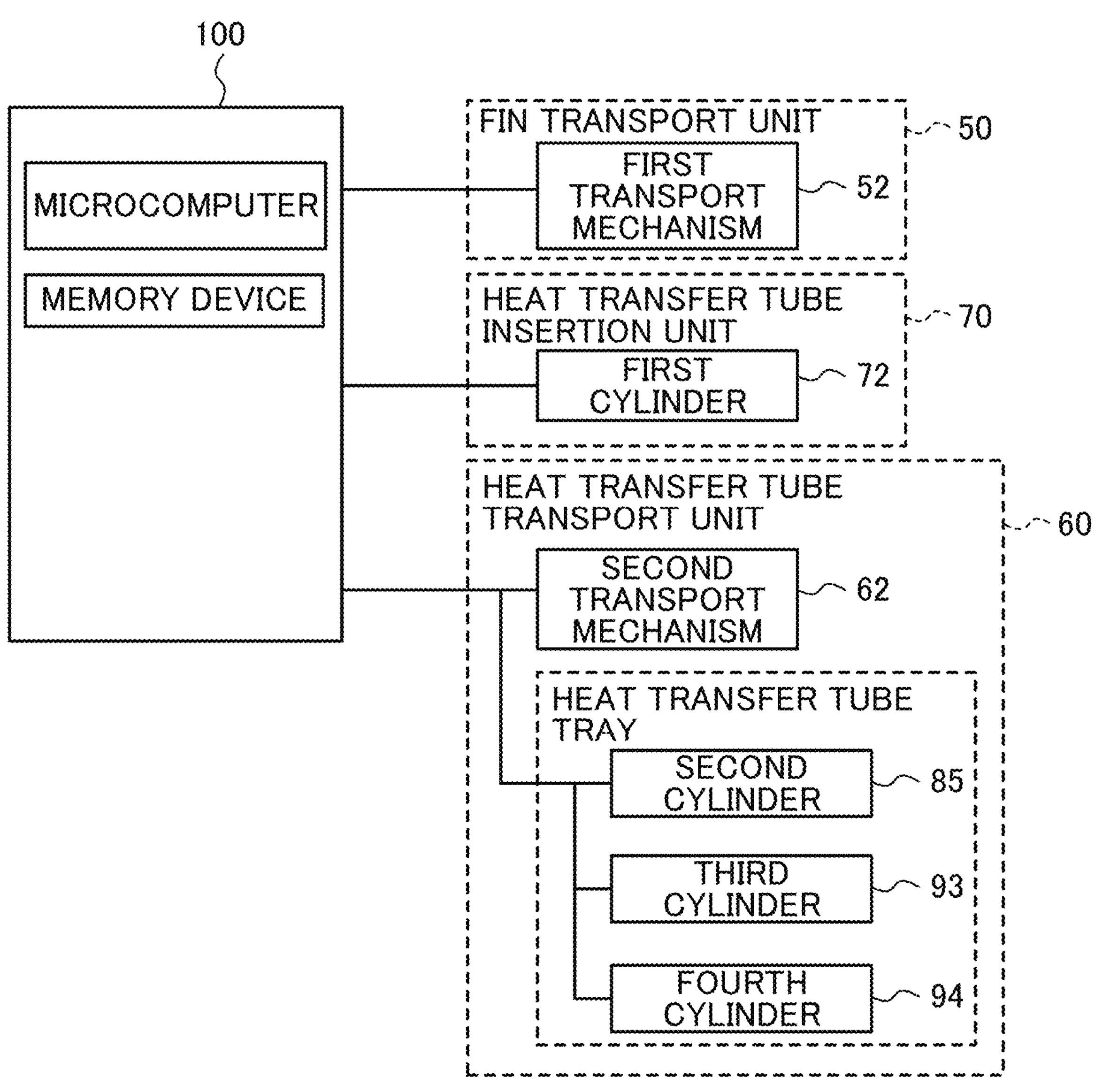
FIG. 10 is a block diagram showing the relationship between a control unit and devices.

As shown in FIG. 10, the manufacturing device (40) includes a control unit (100). The control unit (100) includes a microcomputer and a memory device that stores software for operating the microcomputer. The control unit (100) controls operations of various devices of the manufacturing device (40).

(4) Manufacturing Method for Manufacturing Heat Exchanger

A manufacturing method for manufacturing the heat exchanger of this embodiment will be described with reference to FIGS. 11 to 13B. The manufacturing method includes transporting the heat transfer tubes (20) to the delivery position (P) while the heat transfer tubes (20) maintains an upright posture; lifting up and holding the heat transfer tubes (20) at the delivery position (P); and inserting the held heat transfer tubes (20) into the fin slits (33) from above the fins (30).

Figures 12A, 12B, 12C:
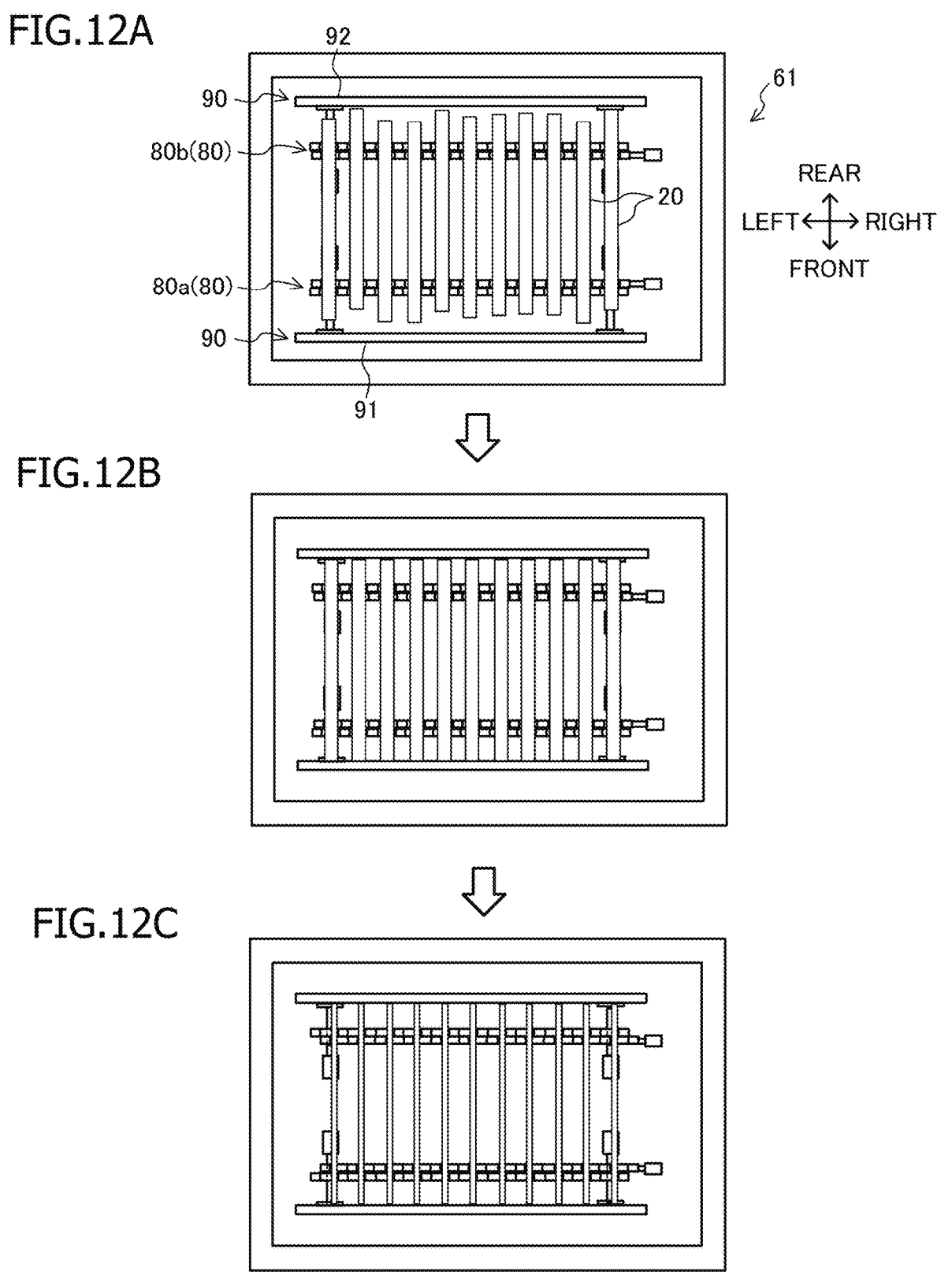
Figures 13A, 13B:
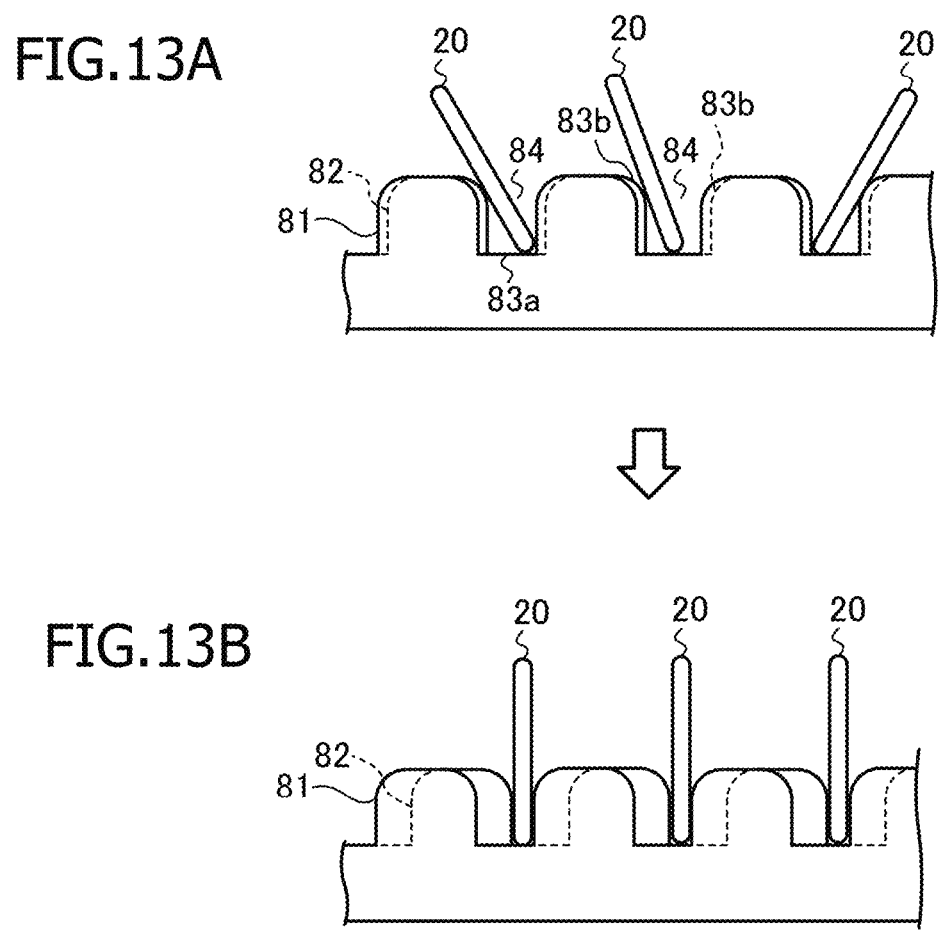

At first, the first correction mechanism (80) is in the first state, and the second correction mechanism (90) is in the third state. The heat transfer tube tray (61) receives the plurality of heat transfer tubes (20) at the left end of the first screw shaft (53). Each heat transfer tube (20) is disposed over the overlapping groove (84) of the front first correction mechanism (80*a*) and the overlapping groove (84) of the rear first correction mechanism (80*b*). At this time, the groove width of the overlapping groove (84) is larger than the thickness of the heat transfer tube (20), and thus each heat transfer tube (20) is inclined at a predetermined angle with respect to the vertical direction (FIG. 12A and FIG. 13A).

In step S11, the control unit (100) controls the second correction mechanism (90) so that the second correction mechanism (90) switches to the fourth state. Specifically, the third piston rod (93*b*) and the fourth piston rod (94*b*) contract at the same time. Accordingly, the third plate member (91) and the fourth plate member (92) approach each other while keeping parallel to each other. The third plate member (91) abuts on the lower ends of the heat transfer tubes (20), and the fourth plate member (92) abuts on the upper ends of the heat transfer tubes (20). Accordingly, the front ends and the rear ends of the heat transfer tubes (20) are aligned (FIG. 12B).

In step S12, the control unit (100) controls the first correction mechanism (80) so that the first correction mechanism (80) switches to the second state. Specifically, the second piston rod (85*b*) contracts. Accordingly, the second plate member (82) moves to the right, and thus the groove width of the overlapping grooves (84) is narrowed. At this time, the heat transfer tubes (20) switch from an inclined posture to an upright posture (FIG. 12C and FIG. 13B). Specifically, in the first state, the plate surface (F) of each heat transfer tube (20) is in contact with the guide portion (83*b*). As the groove width of the overlapping groove (84) become narrower, the heat transfer tube (20) changes to an upright posture while the plate surface (F) slides on the guide portion (83*b*). In the second state, the heat transfer tube (20) is sandwiched between the overlapping grooves (84). In this manner, the heat transfer tube tray (61) makes the heat transfer tubes (20) aligned and stand upright.

In step S13, the control unit (100) controls the second transport mechanism (62) so that the heat transfer tube tray (61) moves to the right. Accordingly, the heat transfer tube tray (61) moves to the delivery position while the heat transfer tubes (20) maintain an upright posture.

In step S14, the control unit (100) controls the first cylinder (72) so that the first piston rod (72*b*) extends. Accordingly, the insertion head (73) moves down. The heat transfer tubes (20) are inserted into and gripped by the grooves (83) of the insertion head (73).

In step S15, the control unit (100) controls the first correction mechanism (80) so that the first correction mechanism (80) switches to the first state, and controls the second correction mechanism (90) so that the second correction mechanism (90) switches to the third state. Accordingly, the groove width of the overlapping grooves (84) increases, and thus the third plate member (91) and the fourth plate member (92) leave the heat transfer tubes (20).

In step S16, the control unit (100) controls the first cylinder (72) so that the first piston rod (72*b*) contracts. Accordingly, the insertion head (73) moves up, and the heat transfer tubes (20) move up while being gripped by the insertion head (73). In other words, the insertion head (73) lifts up and holds the heat transfer tubes (20).

In step S17, the control unit (100) controls the second transport mechanism (62) so that the heat transfer tube tray (61) moves to the left. Accordingly, the heat transfer tubes (20) are supplied to the heat transfer tube tray (61) at the left end of the first screw shaft (53).

In step S18, the control unit (100) controls the first transport mechanism (52) so that the fin tray (51) moves to the left. Accordingly, the fin tray (51) in which the plurality of fins (30) are mounted is disposed at the delivery position (P).

In step S19, the control unit (100) controls the first cylinder (72) so that the first piston rod (72*b*) extends. Accordingly, the insertion head (73) moves down. The heat transfer tubes (20) held by the insertion head (73) are disposed on the corresponding fin slit rows (N). By the insertion head (73) continuing to move down, the heat transfer tubes (20) are inserted into the fin slits (33). When the heat transfer tubes (20) are inserted to the bottoms (83*a*) of the fin slits (33), the insertion head (73) stops.

In step S20, the control unit (100) controls the first cylinder (72) so that the first piston rod (72*b*) contracts. Accordingly, the insertion head (73) moves up. Thereafter, the heat transfer tubes (20) and the fins (30) that have been assembled proceed to the next step.

In step S21, the control unit (100) controls the second transport mechanism (62) so that the fin tray (51) moves to the right.

(5) Features (5-1) First Feature

The manufacturing device (40) of this embodiment includes the heat transfer tube tray (transport carriage) (61) configured to transport the heat transfer tube (flat tube) (20) to a predetermined delivery position (P) while the heat transfer tube (20) maintains an upright posture; and an insertion head (73) disposed at the delivery position (P) and configured to move up and down, thereby receiving the heat transfer tube (20) from the heat transfer tube tray (61) and then inserting the heat transfer tube (20) into the fin slit (33) from above the fin (30).

According to this embodiment, the heat transfer tube tray (61) transports the heat transfer tubes (20) to the delivery position while the heat transfer tubes (20) maintain an upright posture so that the plate surfaces face each other. Accordingly, by simply moving down, the insertion head (73) can insert and grip the heat transfer tubes (20) into the grooves (74) provided on the lower surface of the insertion head (73). In this manner, the heat transfer tubes (20) are less inclined when the heat transfer tube tray (61) moves. Thus, the heat transfer tubes (20) can be easily supplied to the insertion head (73) without the posture of the heat transfer tubes (20) being corrected at the delivery position (P).

(5-2) Second Feature

In the manufacturing device (40) of this embodiment, the heat transfer tube tray (61) includes the first correction mechanism (first mechanism) (80) that changes the heat transfer tube (20) from an inclined posture to an upright posture.

According to this embodiment, even if the heat transfer tube (20) disposed in the heat transfer tube tray (61) is inclined, the heat transfer tube (20) can be corrected to a vertical, upright posture by the first correction mechanism (80). Accordingly, working manually to make the heat transfer tube (20) stand upright can be omitted, and thus the process of assembling the heat exchanger (10) can be simplified.

(5-3) Third Feature

In the manufacturing device (40) of this embodiment, the first plate member (first member) (81) and the second plate member (second member) (82) of the first correction mechanism (80) are arranged so that the grooves (83) of the first plate member (81) overlap the grooves (83) of the second plate member (82) as viewed in the arrangement direction. The first correction mechanism (80) is configured so that in a state in which the heat transfer tube (20) is disposed in both the grooves (83, 83), the second plate member (82) slides so as to to narrow the groove width of both the grooves (83, 83) overlapping each other.

According to this embodiment, the groove width of the overlapping grooves (84) of the first plate member (81) and the second plate member (82) in the second state is increased, and thus the heat transfer tubes (20) are easily arranged in the heat transfer tube tray (61). In addition, by switching from the first state to the second state, the heat transfer tubes (20) stand upright and are sandwiched between the overlapping grooves (84), and thus the heat transfer tubes (20) are less inclined even when the heat transfer tube tray (61) moves. Further, by simply switching from the first state to the second state, the heat transfer tubes (20) can be easily modified to have a vertical, upright posture.

(5-4) Fourth Feature

In the manufacturing device (40) of this embodiment, the heat transfer tube tray (61) includes the second correction mechanism (second mechanism) (90) that align the ends of the plurality of flat tubes (20).

According to this embodiment, the second correction mechanism (90) can align the ends of the plurality of heat transfer tubes (20). When the header collecting pipes (16, 17) are attached to the ends of heat transfer tubes (20), the ends of the plurality of heat transfer tubes (20) need to be aligned (see FIG. 3). the second correction mechanism (90) can easily align the ends of the plurality of heat transfer tubes (20).

(5-5) Fifth Feature

The heat transfer tube tray (61) of this embodiment transports the heat transfer tubes (20) maintaining an upright posture to the delivery position where the insertion head (73) for inserting the heat transfer tubes (20) into the fin slits (33) is disposed.

For example, the heat transfer tube tray (61) of this embodiment can be attached to an existing manufacturing device. Accordingly, the process of assembling the heat transfer tubes (20) and the fins (30) can be simplified.

(5) Other Embodiment

Figures 14A, 14B:
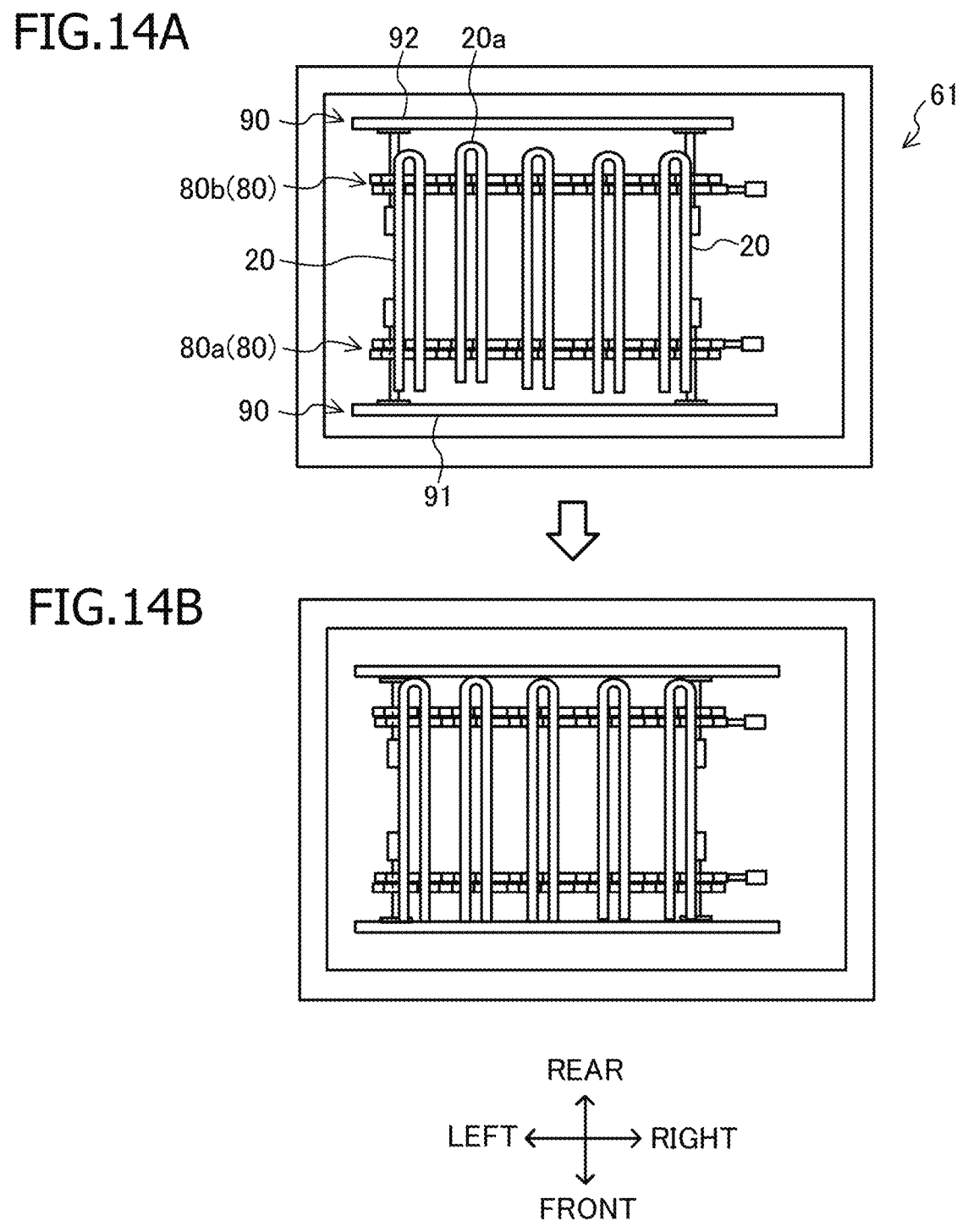

As shown in FIG. 14A and FIG. 14B, the heat transfer tube tray (61) may transport U-shaped heat transfer tubes (20). The U-shaped heat transfer tube (20) is formed by one heat transfer tube (20) being folded at a folding portion (20*a*) as a starting point located at the center. Both ends of the heat transfer tube (20) are near the third plate member (91), and the folding portion (20*a*) of the heat transfer tube (20) is near the fourth plate member (92) (FIG. 14A). When the second correction mechanism (90) switches from the third state to the fourth state, both ends of the heat transfer tubes (20) come into contact with the third plate member (91), and the folding portion (20*a*) of each heat transfer tube (20) comes into contact with the fourth plate member (92) (FIG. 14B). In this manner, the heat transfer tube tray (61) of this example can also align the ends of the U-shaped heat transfer tubes (20) using the second correction mechanism (90).

The second correction mechanism (90) may be configured so that the second plate member (82) is fixed and the first plate member (81) is slidable. Alternatively, both the first plate member (81) and the second plate member (82) may be slidable.

The heat transfer tube tray (61) only has to be capable of transporting the heat transfer tubes (20) maintaining an upright posture, and does not have to include the first correction mechanism (80) and the second correction mechanism (90).

The first mechanism (80) of the heat transfer tube tray (61) only has to be capable of changing the heat transfer tubes (20) from an inclined posture to an upright posture, and does not have to be a mechanism like the first correction mechanism (80) of the above embodiment.

The heat transfer tube tray (61) only has to include the first correction mechanism (first mechanism) (80) and does not have to include the second correction mechanism (second mechanism) (90).

The second mechanism (90) of the heat transfer tube tray (61) only has to be capable of aligning the ends of the heat transfer tubes (20), and does not have to be a mechanism like the second correction mechanism (90) of the above embodiment.

While the embodiment and variations thereof have been described above, it will be understood that various changes in form and details may be made without departing from the spirit and scope of the claims. The embodiments and the variations thereof may be combined and replaced with each other without deteriorating intended functions of the present disclosure. The expressions of "first," "second," . . . described above are used to distinguish the terms to which these expressions are given, and do not limit the number and order of the terms.

As described above, the present disclosure is useful for a manufacturing device and manufacturing method for manufacturing of a heat exchanger and also useful for a transport carriage used for the manufacturing device.

The invention claimed is:

1. A manufacturing device for manufacturing a heat exchanger including a flat tube and a fin that is formed in an elongated plate shape and that includes a fin slit formed by notching the fin in a direction orthogonal to a longitudinal direction of the fin, the manufacturing device comprising:

a transport carriage configured to transport the flat tube to a predetermined delivery position while the flat tube maintains an upright posture; and an insertion head configured to move up and down in order to receive the flat tube from the transport carriage and then insert the flat tube into the fin slit from above the fin, the transport carriage including a first mechanism having a groove configured to receive the flat tube, the first mechanism being configured to change the flat tube from an inclined posture to an upright posture by narrowing a groove width of the groove after the groove receives the flat tube.

2. The manufacturing device of claim 1, wherein the first mechanism includes a first member and a second member adjacent to each other and each including a groove opened upward, the first member and the second member are arranged so that the grooves of the first member and the second member overlap each other as viewed in an arrangement direction, and in a state in which the flat tube is disposed in both the grooves overlapping each other, at least one of the first member and the second member is configured to slide so as to narrow a groove width of both the grooves.

3. The manufacturing device of claim 1, wherein the flat tube includes a plurality of flat tubes arranged in a direction orthogonal to a flat tube longitudinal direction, the plurality of flat tubes being transported to the transport carriage, and the transport carriage includes a second mechanism that aligns ends of the plurality of flat tubes.

4. The manufacturing device of claim 2, wherein the flat tube includes a plurality of flat tubes arranged in a direction orthogonal to a flat tube longitudinal direction, the plurality of flat tubes being transported to the transport carriage, and the transport carriage includes a second mechanism that aligns ends of the plurality of flat tubes.

* * * * *